(12) United States Patent
Baba et al.

(10) Patent No.: US 6,171,728 B1
(45) Date of Patent: Jan. 9, 2001

(54) NICKEL ELECTRODE FOR AKALINE STORAGE CELL AND MANUFACTURING METHOD OF THE SAME

(75) Inventors: Yoshitaka Baba; Motoo Tadokoro; Takayuki Yano, all of Itano-gun (JP)

(73) Assignee: Sanyo Electric Co., Ltd., Osaka-fu (JP)

( * ) Notice: Under 35 U.S.C. 154(b), the term of this patent shall be extended for 0 days.

(21) Appl. No.: 09/110,861

(22) Filed: Jul. 7, 1998

(30) Foreign Application Priority Data

Jul. 7, 1997 (JP) .................................................. 9-181588

(51) Int. Cl.$^7$ .............................. H01M 4/52; H01M 4/32
(52) U.S. Cl. ..................... 429/223; 429/218.1; 429/206; 29/623.5
(58) Field of Search ................................. 429/218.1, 223, 429/206

(56) References Cited

U.S. PATENT DOCUMENTS

| | | | |
|---|---|---|---|
| 4,364,422 | * 12/1982 | Brown et al. ......................... | 141/1.1 |
| 5,079,110 | * 1/1992 | Nakahori et al. .................... | 429/206 |
| 5,629,111 | * 5/1997 | Yamawaki et al. .................. | 429/233 |
| 5,635,313 | * 6/1997 | Abe ...................................... | 429/233 |
| 5,672,447 | 9/1997 | Yamawaki et al. . | |
| 5,688,616 | 11/1997 | Yamawaki et al. . | |
| 5,691,086 | 11/1997 | Baba et al. . | |

* cited by examiner

*Primary Examiner*—Stephen Kalafut
*Assistant Examiner*—Angela J. Martin
(74) *Attorney, Agent, or Firm*—Nixon & Vanderhye

(57) ABSTRACT

A nickel electrode for an alkaline storage cell manufactured by the steps of precipitating cobalt hydroxide on the surface of a first nickel active material essentially composed of nickel hydroxide, subjecting the first nickel active material to heat treatment under the presence of an alkaline solution and oxygen to that the cobalt hydroxide precipitated on the first nickel active material is disordered to its crystal structure and is formed in a higher order cobalt compound containing alkaline cation, and mixing the first nickel active material subjected to the alkali heat treatment with a second nickel hydroxide active material essentially composed of nickel hydroxide without forming any conductive substance of lower in dissolubility to the alkaline solution.

2 Claims, No Drawings

NICKEL ELECTRODE FOR AKALINE STORAGE CELL AND MANUFACTURING METHOD OF THE SAME

BACKGROUND OF THE INVENTION

1. Field of the Invention

The present invention relates to a nickel electrode for an alkaline storage cell such as a nickel-hydrogen storage cell, a nickel-cadmium storage cell, a nickel-zinc storage cell and the like and a manufacturing method for the same. More particularly, the present invention relates to a nickel electrode made of a nickel hydroxide active material containing a conductive agent and a manufacturing method for the same.

2. Description of the Prior Art

In recent years, demands for a high performance storage cell have increased for use in rapid popularization of portable electronic and communication equipments. In the field of alkaline storage cells, there have been proposed various improvements for enhancing the utilization factor of a nickel hydroxide active material in a positive electrode of the alkaline storage cell. For example, there have been proposed a method for adding a cobalt compound or metal nickel powder to a nickel hydroxide active material as a conductive agent and a method for precipitating a cobalt compound or metal nickel powder on the surface of a nickel hydroxide active material.

Although the conductivity of a cobalt compound having an oxidation value of 2 is low, the cobalt compound becomes a higher order state when the oxidized at during initial charge and discharge of the cell. In addition, cobalt hydroxide is oxidized by charging of the cell and precipitated on the surface of the nickel hydroxide active material as oxy-cobalt hydroxide. When the cell is discharged, the oxy-cobalt hydroxide is partly reduced and dissolved in electrolyte. With such reaction of the cobalt hydroxide, a conductive network is uniformly formed on the surface of the nickel hydroxide active material. This is useful to reduce the electrical potential of an isolated portion and to enhance the utilization factor of the active material.

In the method of precipitating a cobalt compound on the surface of the nickel hydroxide active material, 1 discharge reaction of the active material occurs as represented by the following formula (1).

$$NiOOH + H_2O + e^- \rightarrow Ni(OH)_2 + OH^- \tag{1}$$

The discharge reaction of the formula (1) is effected on the surfaces of nickel hydroxide particles in spherical form under the presence of a sufficient amount of $H_2O$ and $OH^-$. For this reason, if the amount of $H_2O$ and $OH^-$ is insufficient, the cobalt compound ineffective in the reaction of formula (1) is uniformly precipitated on the surfaces of the nickel hydroxide particles. This decreases the utilization factor of the active material.

On the other hand, if the conductive layer is irregularly formed on the nickel hydroxide particles, the utilization factor of the active material is enhanced by the reaction of formula (1), but it becomes difficult to uniformly form irregular conductive layers on the nickel hydroxide active material.

SUMMARY OF THE INVENTION

It is, therefore, a primary object of the present invention to provide a nickel electrode for an alkaline storage cell superior in utilization factor of an active material and to provide a method capable of manufacturing the nickel electrode in a simple manner.

According to the present invention, the object is accomplished by providing a nickel electrode for an alkaline storage cell, which comprises a first active material essentially composed of nickel hydroxide particles covered with a conductive substance lower in dissolubility to aqueous alkaline solution, and a second active material essentially composed of nickel hydroxide particles without forming the conductive substrate, wherein the nickel electrode is formed by a mixture of the first and second active materials.

In a practical embodiment of the present invention, it is preferable that the conductive substance of the first active material is metal nickel or a cobalt compound of more than +2 in oxidation value and is 1 to 10 wt % with respect to the entirety of the first and second active materials, and it is also preferable that the second active material is 10 to 40 wt % with respect to the first active material.

According to an aspect of the present invention, there is provided a manufacturing method for a nickel electrode for an alkaline storage cell, which comprises the steps of precipitating cobalt hydroxide on the surface of a first nickel active material essentially composed of nickel hydroxide, subjecting the first nickel active material to heat treatment under the presence of an alkaline solution and oxygen so that the cobalt hydroxide precipitated on the first nickel active material is disordered in its crystal structure and is formed in a higher order cobalt compound containing alkaline cation, mixing the first nickel active material subjected to the alkali heat treatment with a second nickel hydroxide active material essentially composed of nickel hydroxide without forming any conductive substance lower in dissolubility to the alkaline solution.

In the manufacturing method of the nickel electrode, it is preferable that the second nickel hydroxide active material is 10 to 40 wt % with respect, to the first nickel hydroxide active material subjected to the alkali heat treatment, and it is also preferable that an amount of cobalt in the higher order cobalt compound is 1 to 10 wt % with respect to the entirety of the first and second nickel hydroxide active materials.

DESCRIPTION OF THE PREFERRED EMBODIMENT

Preparation of Active material slurry

Embodiment

While an amount of aqueous solution mixed with nickel sulfate, zinc sulfate and cobalt sulfate at a ratio by weight of 100:3:1 was stirred, an amount of aqueous solution of sodium hydroxide and ammonia was gradually added so that pH of the reaction solution was maintained at 13–14 to precipitate nickel hydroxide particles. Thereafter, an amount of aqueous solution of cobalt sulfate of specific gravity 1.30 and 25 wt % sodium hydroxide was added to the solution containing the precipitated nickel hydroxide particles so that, the pH of the reaction solution was maintained at 9–10 to precipitate cobalt hydroxide around crystal cores in the form of the precipitated nickel hydroxide particles. The precipitated particles were collected, washed by water and dried to produce a nickel hydroxide active material of the nickel-zinc-cobalt type in the form of nickel hydroxide particles covered with the cobalt hydroxide. When the cobalt hydroxide was formed on the surface of the nickel hydroxide active material, 7 wt % cobalt hydroxide relative to the entirety of the nickel hydroxide active material was produced.

In the nickel hydroxide active material of the nickel-zinc-cobalt type, the surfaces of the nickel hydroxide particles were covered with the cobalt hydroxide precipitated thereon. Although a small amount of dissolved nickel compound was impregnated in the nickel hydroxide particles prior to addition of alkaline solution composed of the aqueous solution of cobalt sulfate and aqueous solution of sodium hydroxide, the dissolved nickel compound was precipitated in the nickel hydroxide particles integrally with the cobalt hydroxide by addition of the alkaline solution. As a result, the cobalt hydroxide was formed on the surfaces of the nickel hydroxide particles as a thick layer and formed in the interior of nickel hydroxide particles as a thin layer.

The nickel hydroxide particles covered with the cobalt hydroxide were sprayed with alkaline solution (35 wt % sodium hydroxide) under heat stream in an oxygen atmosphere. In this instance, the heat temperature of the nickel hydroxide particles was maintained at about 60° C. and raised up to 90° C. after an amount of alkaline solution (35 wt % sodium hydroxide) five times the amount of cobalt was sprayed on the nickel hydroxide particles. During the alkali heat treatment, the cobalt hydroxide formed on the nickel hydroxide particles was disordered in its crystal structure, while oxidation of the nickel hydroxide was strongly effected to produce a higher order cobalt compound of more than +2 in average oxidation value. As a result, the higher order cobalt compound superior in conductivity was formed on the nickel hydroxide particles. The higher order cobalt compound was produced as a substance lower in dissolubility to alkaline solution (alkaline electrolyte). Hereinafter, the nickel hydroxide particles covered with the higher order cobalt compound superior in conductivity are referred to as active material A.

On the other hand, while an amount of aqueous solution mixed with nickel sulfate, zinc sulfate and cobalt sulfate at a ratio by weight of 100:3:1 was stirred, an amount of aqueous solution of sodium hydroxide and ammonia was gradually added so that pH of the reaction solution was maintained at 13–14 to precipitate nickel hydroxide particles. Thereafter, the reaction solution was filtrated, washed by water and dried to produce nickel hydroxide particles of the nickel-zinc-cobalt type. An active material composed of the nickel hydroxide particles is referred to as active material B hereinafter.

70 parts by weight of the active material A, 30 parts by weight of the active material B and 50 parts by weight of 0.2 wt % hydroxypropyl cellulose were mixed and stirred to produce an active material slurry containing 4.9 wt % cobalt relative to the entirety of the nickel hydroxide active materials. The active material slurry is referred to as $A_1$ hereinafter.

COMPARATIVE EXAMPLE 1

100 parts by weight of the active material B, 4.9 parts by weight of cobalt oxide and 50 parts by weight of 0.2 wt % hydroxypropyl cellulose were mixed and stirred to produce an active material slurry referred to as $B_1$ hereinafter.

COMPARATIVE EXAMPLE 2

100 parts by weight of the active material A (formed thereon with 4.9 wt % cobalt hydroxide relative to the entirety of the active materials) and 50 parts by weight of 0.2 wt % hydroxypropyl cellulose were mixed and stirred to produce an active material slurry referred to as $B_2$ hereinafter.

Manufacture of Nickel electrode

A substrate composed of foamed nickel of 95% porous degree and of 1.6 mm thickness was impregnated with each of the active material slurries $B_1$ and $B_2$ and dried after being immersed in aqueous solution of polytetrafluoroethylene. After being dried, the substrate was rolled under pressure to a thickness of 0.60 mm to produce a non-sintered type nickel positive electrode.

Manufacture of Negative electrode

Misch metal (Mm: a mixture of rare earth elements), nickel, cobalt, aluminum and manganese were mixed at a ration of 1:3.6:0.6:0.2:0.6. The mixture was heated in a high frequency induction furnace having an argon gas atmosphere and cooled in a well-known manner so that an ingot of hydrogen-absorbing alloy represented by a composition formula $Mm_{1.0}Ni_{3.6}Co_{0.6}Al_{0.2}Mn_{0.6}$ was produced. The ingot of hydrogen-absorbing alloy was mechanically pulverized into hydrogen-absorbing alloy powder in average particle size of about 100 microns. The hydrogen-absorbing alloy powder was mixed with a binder such as polyethylene oxide and a small amount of water to produce hydrogen-absorbing alloy paste. The paste was coated on a punched sheet metal, dried and rolled under pressure to a thickness of about 0.4 mm to produce a negative electrode of hydrogen-absorbing alloy.

Manufacture of Nickel-hydrogen storage cell

The non-sintered type positive electrode (cut into a pre-determined size containing 5 g of the nickel hydroxide active material) and the negative electrode of hydrogen-absorbing alloy were stacked through a separator made of a unwoven polypropylene fiber, rolled up and inserted into a cylindrical cell vessel into which aqueous solution of potassium hydroxide was injected. Thereafter, the cell vessel was sealed to produce a nickel-hydrogen storage cell of AA size and nominal capacity 120 AH.

Experiment of Cell capacity

The nickel-hydrogen storage cells produce in the manner described above each were charged at a current of 0.1 C. (120 mA) for 16 hours and discharged at a current of 0.25 C. until the cell voltage became 1.0 V. Thus, the discharge capacity of the cell per 1 g of nickel hydroxide active material (the discharge capacity per unit active material) was measured on the basis of the discharging time. A result of the measurement is shown in the following Table 1, wherein the discharge capacity per unit active material of the cell using the active material slurry $A_1$ is represented as 100.

TABLE 1

| Active material slurry | Discharge capacity per unit active material |
| --- | --- |
| A1 | 100 |
| B1 | 93 |
| B2 | 97 |

As shown in Table 1, the discharge capacity per unit active material of the nickel-hydrogen storage cell using the active material slurry $A_1$ produced in the embodiment was larger than that of the nickel-hydrogen storage cells using the active material slurries $B_1$, $B_2$, while the discharge capacity per unit active material of the nickel-hydrogen storage cell using the active material slurry $B_2$ was larger than that of the nickel-hydrogen storage cell using the active material slurry $A_1$.

From the above-described facts, it has been found that the active material B subjected to the alkali heat treatment after the cobalt hydroxide was formed on the nickel hydroxide particles is superior in conductivity with respect to the active material A composed of the mixture of nickel hydroxide active material and cobalt oxide. This effective to enhance the utilization factor of the active material thereby to increase the discharge capacity per unit active material. Even if the nickel hydroxide active material is composed of the mixture of the active material A and B without forming the cobalt hydroxide thereon, a conductive network is formed on the nickel hydroxide active material without an electrically isolated portion. This is effective to enhance the utilization factor of the active material thereby increasing the discharge capacity per unit active material.

Evaluation of addition of the active material B

The relationship of an additional amount of the active material B and the discharge capacity per unit active material was evaluated as follows: 95 parts by weight of the active material A. 5 parts by weight of the active material B and 50 parts by weight of 0.2 wt % hydroxyplopyl cellulose were mixed and stirred to prepared an active material slurry $C_1$. Similarly, an active material slurry $C_2$ was prepared by a mixture of 90 parts by weight of the active material A and 10 parts by weight of the active material B, an active material $C_3$ was prepared by a mixture of 70 parts by weight of the active material A and 30 parts by weight of the active material B, an active material slurry $C_4$ was prepared by a mixture of 60 parts by weight of the active material A and 40 parts by weight of the active material B, and an active material slurry $C_5$ was prepared by a mixture of 55 parts by weight of the active material A and 45 parts by weight of the active material B. In this evaluation, the amount of cobalt formed on the surface of the active material A used in the active material slurries $C_1$–$C_5$ was adjusted to be 5 wt % relative to the entirety of the nickel hydroxide active materials after being mixed with the active material B.

A substrate composed of 95% porous degree and 1.6 mm thickness was impregnated with each of the active material slurries $C_1$–$C_5$ and dried after being immersed in an aqueous solution of polytetrafluoroethylene. After being dried, the substrate was rolled under pressure to a thickness of 0.6 mm to produce a non-sintered nickel positive electrode. The non-sintered nickel positive electrode and the foregoing negative electrode of hydrogen-absorbing alloy were stacked through a separator made of an unwoven polypropylene fiber, rolled up and inserted into a cylindrical cell vessel into which aqueous solution of potassium hydroxide was injected. Thereafter, the cell vessel was sealed to produce a nickel-hydrogen storage cell of AA size and nominal capacity 1.2 AH.

The nickel-hydrogen storage cell was charged at a current of 0.1 C. for 16 hours and discharged at a current of 0.25 C. until the cell voltage became 1.0 V. Thus, the discharge capacity of the cell per 1 g of the nickel hydroxide active material (the discharge capacity per unit active material) was measured on the basis of the discharging time. The result of the measurements is shown in the following Table 2, wherein the discharge capacity per unit active material of the active material slurry $C_3$ is represented as 100.

TABLE 2

| Active material slurry | Amount of cobalt | Amount of active material B | Discharge capacity per unit active material |
|---|---|---|---|
| C1 | 5 wt % | 5 wt % | 97 |
| C2 | 5 wt % | 10 wt % | 99 |
| C3 | 5 wt % | 30 wt % | 100 |
| C4 | 5 wt % | 40 wt % | 99 |
| C5 | 5 wt % | 45 wt % | 92 |

As is understood from Table 2, it has been found that if the additional amount of the active material B is reduced, the discharge capacity per unit active material is decreased, and it has been also found that if the additional amount of the active material B is increased, the discharge capacity per unit active material is decreased since a conductive network may not be sufficiently formed. It is, therefore, desirable that the additional amount of the active material B be in the range 10 wt %–40 wt %.

Evaluation of the amount of cobalt

The relationship between the amount of cobalt and the discharge capacity per unit active material was evaluated as follows: While an amount of aqueous solution mixed with nickel sulfate, zinc sulfate and cobalt sulfate at a ratio by weight of 100:3:1 was stirred, an aqueous solution of sodium hydroxide and ammonia was gradually added so that the pH of the reaction solution was maintained at 13–14 to precipitate nickel hydroxide particles. Thereafter, an aqueous solution of cobalt sulfate of 1.30 in specific gravity and 25 wt % sodium hydroxide was added to a solution containing the precipitated nickel hydroxide particles in such a manner that the pH of the reaction solution was maintained at 9–10 to precipitate cobalt hydroxide around crystal cores in the form of the precipitated nickel hydroxide particles. In this instance, the additional amount of the aqueous solution of cobalt sulfate was adjusted to precipitate the cobalt hydroxide respectively at 0.71 wt %, 1.43 wt %, 7.1 wt %, 14.3 wt % and 20.0 wt % relative to the nickel hydroxide active material.

The nickel hydroxide particles adjusted in the amount of cobalt hydroxide were collected, washed by water and dried to produce nickel hydroxide active materials D1, D2, D3, D4 and D5 of the nickel-zinc-cobalt type formed thereon with the cobalt hydroxide in particle form respectively at 0.71 wt %, 1.43 wt %, 7.14 wt %, 14.3 wt % and 20.0 wt %. Thus, 70 parts by weight of each of the nickel hydroxide active materials $D_1$–$D_5$ subjected to an alkali heat treatment and 30 parts by weight of the active material B were mixed and stirred to produce active material slurries $D_1$, $D_2$, $D_3$, $D_4$ and $D_5$. The amount of cobalt formed on each surface of the active materials a1 used in the slurries D1–D5 were 0.5 wt %, 1.0 wt %, 5.0 wt % and 10.0 wt % and 14.0 wt % relative to the entirety of the nickel hydroxide active material after mixed with the active material a2. A substrate composed of foamed nickel of 95% in porous degree and of 1.6 mm in thickness was impregnated with each of the active material slurries $D_1$–$D_5$ and dried after being immersed in an aqueous solution of polytetrafluoroethylene. After being dried, the substrate was rolled under pressure to a thickness of 0.6 mm to produce a non-sintered nickel positive electrode.

Each non-sintered nickel positive electrode produced in such a manner as described above and the foregoing negative electrode of hydrogen-absorbing alloy were stacked through a separator made of a unwoven polypropylene fiber, rolled up and inserted into a cylindrical cell vessel into which an aqueous solution of potassium hydroxide was injected. Thereafter, the cell vessel was sealed to produce a nickel-hydrogen storage cell of AA size and nominal capacity 1.2 AH. The nickel-hydrogen storage cell was charged at a current of 0.1 C. for 16 hours and discharged at a current of 0.25 C. until the cell voltage became 1.0 V to measure the discharge capacity per 1 g of the nickel hydroxide active material (discharge capacity per unit active material) based on the discharging time. Results of the measurements are shown in the following Table 3, wherein the discharge capacity per unit active material of the cell using the active material slurry D3 is represented as 100.

TABLE 3

| Active material slurry | Amount of cobalt | Amount of active material B | Discharge capacity per unit active material |
|---|---|---|---|
| D1 | 0.5 wt % | 30 wt % | 90 |
| D2 | 1.0 wt % | 30 wt % | 99 |
| D3 | 5.0 wt % | 30 wt % | 100 |
| D4 | 10.0 wt % | 30 wt % | 100 |
| D5 | 14.0 wt % | 30 wt % | 96 |

As is understood from Table 3, it has been found that the discharge capacity per unit active material is decreased regardless of the amount of cobalt for the following reason. If the amount of cobalt is less than 1.0 wt %, the conductive network formed in the active material becomes insufficient. As a result, the discharge capacity per unit active material is decreased due to insufficient reduction of the active material during the discharging process. If the amount of cobalt is more than 10.0 wt %, the conductive network formed in the active material becomes sufficient, but the amount of the nickel hydroxide active material directly applied with the electrochemical reaction is decreased due to the cobalt being ineffective be the electrochemical reaction. This results in a decrease of the discharge capacity per unit active material. It is, therefore, desirable that the amount of cobalt be in the range 1.0–10 wt % relative to the entirety of the active material.

Although in foregoing embodiments, the cobalt hydroxide was precipitated on the surface of the nickel hydroxide active material as the active material a1 and subjected to the alkali heat treatment to produce a higher order cobalt compound lower in dissolubility to the alkaline solution (alkaline electrolyte), metal nickel may be precipitated on the surface of the nickel hydroxide active material as the active material a1. In such a case, it is not necessary to subject the metal nickel to the alkali heat treatment since the metal nickel is a conductive substance lower in dissolubility to the alkaline solution.

What is claimed is:

1. A nickel electrode for an alkaline storage cell, said electrode comprising:

a first active material substantially composed of nickel hydroxide particles covered with a metal nickel or cobalt compound of more than ±2 in oxidation value conductive substance which is lower in dissolubility with respect to an aqueous alkaline solution, and a second active material substantially composed of nickel hydroxide particles without any conductive substance thereon, wherein the nickel electrode is formed by a mixture of said first and second active materials, the conductive substance of said first active material is 1 to 10 wt % with respect to the entirety of said first and second active materials, and said second active material is 10 to 40 wt % with respect to said first active material.

2. A manufacturing method for a nickel electrode for an alkaline storage cell, said method comprising the steps of:

precipitating cobalt hydroxide on the surface of a first nickel active material substantially composed of nickel hydroxide;

subjecting said first nickel active material to heat treatment in the presence of an alkaline solution and oxygen so that the cobalt hydroxide precipitated on said first nickel active material is disordered in its crystal structure and is formed in a higher order cobalt compound containing alkaline cation;

mixing said first nickel active material subjected to the alkali heat treatment with a second nickel hydroxide active material substantially composed of nickel hydroxide without forming any conductive substance of lower in dissolubility to an alkaline solution wherein said second nickel hydroxide active material is 10 to 40 wt % with respect to said first nickel hydroxide active material subjected to the alkali heat treatment, and an amount of cobalt in said higher order cobalt compound is 1 to 10 wt % with respect to the entirety of said first and second nickel hydroxide active materials.

* * * * *